Feb. 7, 1956 D. McLACHLAN, JR 2,733,631
OPTICAL ANALOG COMPUTER USING PROJECTED LIGHT PATTERNS
Filed Oct. 14, 1952 2 Sheets-Sheet 1
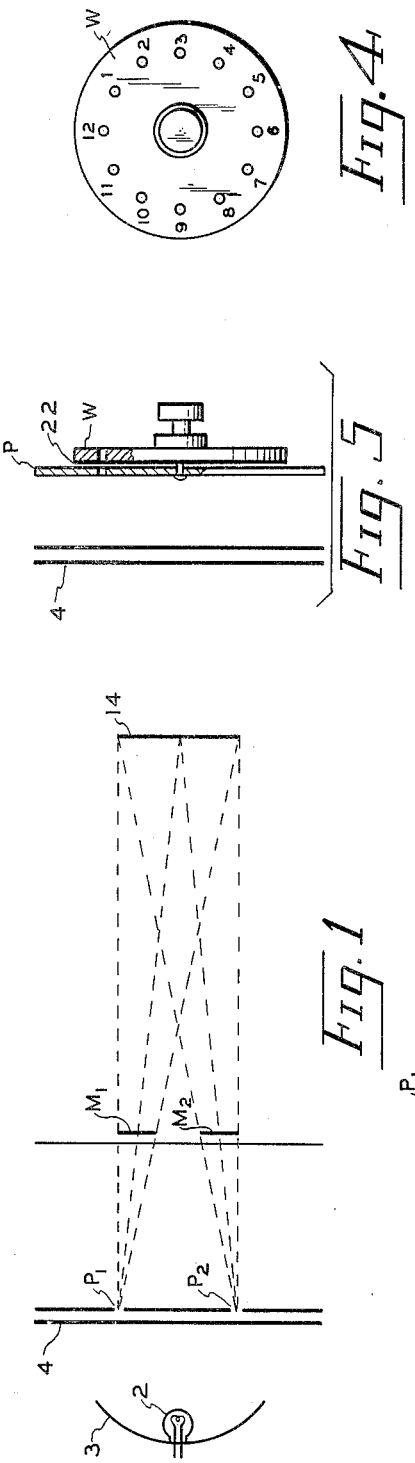
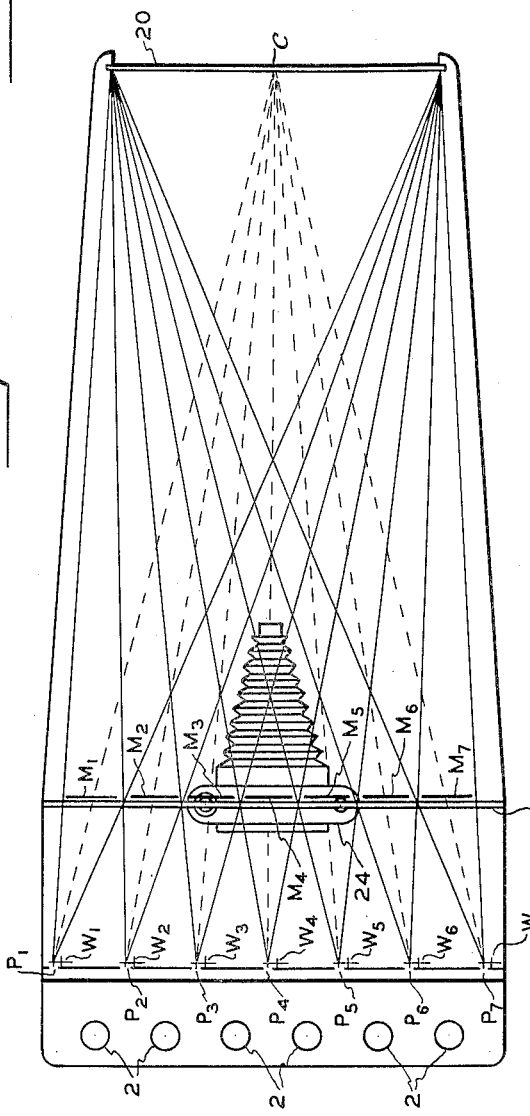
INVENTOR
DAN McLACHLAN JR.
BY Harold T. Stowell
ATTORNEY Feb. 7, 1956  D. McLACHLAN, JR  2,733,631
OPTICAL ANALOG COMPUTER USING PROJECTED LIGHT PATTERNS
Filed Oct. 14, 1952  2 Sheets-Sheet 2

INVENTOR
DAN McLACHLAN JR.

BY Harold T. Stowell

ATTORNEY

United States Patent Office 2,733,631
Patented Feb. 7, 1956

2,733,631

OPTICAL ANALOG COMPUTER USING PROJECTED LIGHT PATTERNS

Dan McLachlan, Jr., Salt Lake City, Utah, assignor to Research Corporation, New York, N. Y., a corporation of New York Application October 14, 1952, Serial No. 314,728

8 Claims. (Cl. 88—14)

This invention relates to crystal analysis by X-ray diffraction, and more particularly to an optical device for producing an optical picture representative of a structure of a crystalline material, or of the unknown structure of a known material. In order to make more clear the subject matter as well as the nature of this invention, a brief discussion will be given of the subject matter to which it relates.

A crystal may be regarded as a geometrical, three dimensional lattice of scattering centers. By this is meant centers which are capable of scattering X-rays so as to produce diffraction phenomena. Modern theory indicates that the diffracted beams so produced result from the coherent scattering of the rays by the electrons in the atoms. Since the atoms in a crystal are arranged in a regular fashion to produce the above mentioned three dimensional lattice, measurement of the angles and intensities of the diffracted beams produces information from which a picture of the crystal structure can be built up. Unfortunately, there are a large number of maxima of varying intensity, in a typical case as many as 100 to 200, and although a mathematical analysis of the data is possible, such a solution by known mathematical methods is extremely laborious and tedious and in a typical case may require months of computation.

A brief description will now be given of one basic form of X-ray spectrometer used in obtaining these data. The crystal to be analyzed is mounted so that it can be rotated about an axis which lies in the plane of one of the more prominent crystal faces and is parallel to the more important zone axes of the crystal, usually of one principal axis. A very narrow beam of monochromatic X-rays is then allowed to fall on the crystal. An ionization chamber or a Geiger-Mueller counter is placed at a predetermined angle to the face of the crystal so that a high reading for the ionization current will be obtained if diffraction occurs, which reading will drop off to nearly zero when the angle changes even very slightly. By this means, the direction and intensity of the diffracted beam can be measured. The crystal, mounted as above, is rotated so that the incident X-ray beam strikes a selected crystal face at a glancing angle of three or four degrees. The ionization chamber is then slowly moved around in the angular region at which a diffracted beam may be expected to lie to determine whether a maximum occurs; if so, the angle is noted as well as the ionization current which is a function of the intensity. The ionization current at several slightly greater and slightly smaller angles is also noted.

In order to record all the diffraction maxima in this manner, it is necessary to repeat this procedure for values of the angle varying by small intervals, say one-tenth of a degree over the range from three or four degrees up to twenty or twenty-five degrees, by rotating the crystal table one-tenth of one degree after each set of readings.

This tedious process may be speeded up somewhat by various modifications but it will be apparent in any event that a large amount of data will be accumulated in a typical case.

The use of Fourier series as an analytical method of deriving crystal structure from the experimental diffraction data was first suggested in 1915 by W. G. Bragg and later developed to a practical, but tedious, method of analysis. The density is calculated usually for 600 or more evenly distributed points, and the points of equal density are joined by lines like contour lines on a map. In the case of a typical fairly complex crystal the series has about forty terms. Bragg has shown that it is possible to sum the components of the series by an optical device rather than mathematically. Several hundred lantern slides bearing alternating light and dark bands with a direction and spacing corresponding to the various components of the series are projected successively onto photographic paper, the time of each exposure being proportional to the amplitude of the component which it represents. After development, the resulting "X-ray micrograph" is an approximation to a picture of the ultimate structure of matter. The atoms appear in their lattice as one might expect to see them if he had a microscope capable of useful magnification of the order of 100 million diameters. Since then, various improvements have been made, one of the more recent ones being described in an article in The Review of Scientific Instruments, June 1951, entitled "A multiple projector for the huggins mask," by D. McLachlan, Jr. and H. Woolley. The present invention is an improvement of the above-described device. The above-described multiple projector provided for the simultaneous projection of light through a number of masks known as Huggins masks, which are an improvement over the original bands of Bragg. A separate light source is provided for each of the Huggins masks, the intensity of the light projected through each mask being again proportional to the amplitude of the component that it represents.

It is an object of the present invention to obviate the need for a separate light source behind each mask. However, it is still necessary to project the images of perhaps one hundred and seventy or more masks upon the same screen. This may easily be done without the use of lenses, by taking full advantage of the linear propagation of light. Since there is one mask for each term and the summation is performed by the projector, serving as a computer, the apparatus must therefore accomplish two purposes; (1) to hold in a fixed position one hundred and seventy or more masks, and (2) to cast simultaneously the images of the one hundred and seventy masks upon the same screen and in registry. It is an object of my invention to accomplish the above purposes.

Another is to provide in a smaller and very much simplified form a machine which will accomplish the same purpose as the multiple projector above described.

The specific nature of the invention, as well as other objects and advantages thereof, will clearly appear from a description of a preferred embodiment as shown in the accompanying drawing in which:

Fig. 1 is a schematic diagram used in explaining the principles of the invention;

Fig. 2 is a schematic side view, partly in section, showing the basic construction of an apparatus built in accordance with the invention;

Figs. 4 and 5 are respectively front and side views of the discs used to control the intensity of light passing through each mask.

Figure 3:
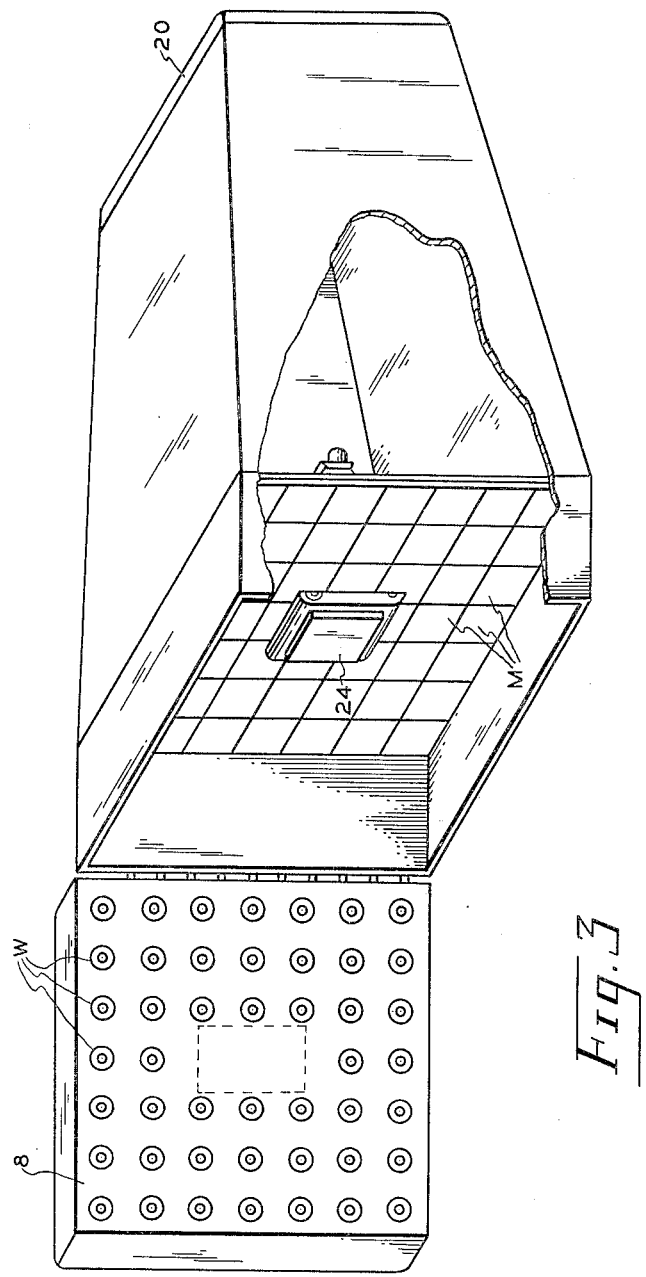
Fig. 3 is a perspective view of the apparatus, partly broken away to show some details thereof.

Referring to Fig. 1, the light bulbs 2 provided with suitable reflectors 3 cast light upon a diffusing screen 4 which behaves as a new light source over its entire area. In a templet 6 there are drilled holes at $P_1$ and $P_2$, etc., of about one millimeter in diameter. This templet prevents light from escaping to the right of the apparatus except through the holes at $P_1$, $P_2$, etc. Thus, the points $P_1$, $P_2$, etc., behave as new light sources at the positions desired. The masks $M_1$ and $M_2$ are so positioned that for each mask the light from a corresponding pinhole at $P_1$ or $P_2$, will fall, after passing through the mask, upon the same screen area at 14. Thus the images formed by the mask are superimposed upon the screen. It is the summation of the images formed by a large number of such masks upon a single screen which is the result desired.

Referring to Fig. 2, the masks $M_1$ to $M_7$ are equivalent to the masks $M_1$ and $M_2$ shown in Fig. 1. They are supported on a single glass plate 18 upon which they have been photographically recorded in predetermined positions. In this way their positions are easily duplicated for manufacture by photographic means. Thus it is not necessary to use a separate slide for each mask as in the multiple projector previously referred to. The holes, $P_1$, $P_2$, etc., and the masks $M_1$, $M_2$, etc., are so positioned that their images are coincident on the screen 20 which corresponds to the screen 14 as shown in Fig. 1, and all of the images have a common center C.

It is, of course, necessary to control the intensity of the light projected through each mask. This was done in the multiple projector by attaching a rheostat to each lamp. However, the present invention uses a much simpler scheme. Mounted adjacent to each pinhole, $P_1$ to $P_7$, is a corresponding disc, $W_1$ to $W_7$, conveniently made of brass, and divided into twelve sectors, in each one of which is drilled a one-eighth inch hole through which light may pass. The disc is so mounted that as it is rotated about its axis the holes come successively into coincidence with the pinhole, $P_1$, $P_2$, etc., which corresponds to that disc. Fastened to each disc there is a piece of photographic film 22 (Fig. 5), which is divided into twelve sectors, each of which has a different transmission for light. The first sector permits all the light to go through, the second permits eleven-twelfths of the light to go through, the third ten-twelfths, and so on, until the eleventh sector permits only one-twelfth of the light to pass through. Thus by rotating the disc to a desired position the intensity of light transmitted through the hole may be controlled. Fig. 4 shows the disc W with holes 1 to 12.

Fig. 3 is a perspective view of the projector, with the template 8 on the light box 9 and the discs W mounted on the template. The masks M are also shown in position surrounding a camera 24 which is employed to take a picture of the composite optical image. This picture is, of course, the desired result, and represents the summation of all the factors optically projected upon the screen. It would, of course, also be possible to employ a photographic slide holder in place of the screen 20 and to record the image directly upon it. In either case, if the correct data are put into the machine, a photographic representation is obtained of the molecules within the crystals projected upon one of the crystal faces, which is the desired result. The data, of course, are represented by the various selected values of light intensity determined by the disc setting for each pinhole, and by the corresponding mask M for each pinhole.

It will be apparent that the embodiments shown are only exemplary and that various modifications can be made in construction and arrangement within the scope of my invention as defined in the appended claims.

I claim:

1. An optical analog computer for summing optically the effect of a number of individual factors, each having two parameters, which comprises a common light source, means for simultaneously projecting from said source on the same area a number of independent light patterns representing respectively said factors, means for independently adjusting the intensity of each light pattern, each pattern having a light distribution over said area corresponding to one of said parameters, and a relative intensity corresponding to the other of said parameters.

2. The invention according to claim 1 including means for obtaining an indication of the total optical effect produced by the summation of said projections on said area.

3. The invention according to claim 2, wherein said area is the surface of a screen.

4. An optical analog computer for crystal structure determination comprising means for summing optically the integrated effect of a number of individual components of a Fourier series, each component having two main parameters, which comprises a common light source of uniform intensity, means for deriving similar individual beams of light from said source, means for individually varying the intensity of each of said beams in accordance with one of said parameter, means for simultaneously projecting each said intensity-controlled beam through a mask with a light distribution over said area corresponding to the other of said parameters, onto the same area of a screen.

5. The invention according to claim 4 including a screen positioned in said area to receive the combined optical projections of said beams.

6. An optical analog computer for summing optically the effect of a number of individual components representing factors of crystal structure, comprising a light source, a diffuser for diffusing light from said source to a uniform intensity over an area, a template positioned in said area for uniform illumination by the diffused light, a number of pinholes in said template, an adjustable first mask adjacent each pinhole having selective uniform portions of graduated light density for selectively controlling the intensity of each beam of light through said pinhole from said source, and a fixed second mask in the path of each said beam of light, a pattern on each said second mask corresponding to a selected parameter of one of said factors, said pinholes and masks being so positioned as to project the modified beam from each pinhole through said second mask onto a common area to produce a combined optical field.

7. The invention according to claim 6, wherein each said first mask comprises a rotatable disc positioned adjacent to a pinhole so that rotation of said disc brings successive areas of the disc opposite to the adjacent pinhole, a number of light transmitting apertures on said disc so positioned as to be successively exposed to said pinhole as said disc is rotated, and a graded light transmitting material in line with each of said apertures and pinholes whereby said aperture and said pinhole when in line define a light beam, successive said light beams being of graded intensity as said disc is rotated.

8. The invention according to claim 7, said common area comprising a screen, and means for obtaining a photographic picture of the effect of said combined optical field on said screen.

References Cited in the file of this patent

UNITED STATES PATENTS

| | | |
|---|---|---|
| 1,797,066 | Zimmer | Mar. 17, 1931 |
| 2,184,507 | Jobe | Dec. 26, 1938 |
| 2,200,358 | Haskin | May 14, 1940 |

OTHER REFERENCES

McLachlan et al.: "Multiple Projector for the Huggins Masks," pages 423–427, Review of Scientific Instruments, June 1951.